United States Patent
Geuens et al.

(10) Patent No.: US 12,253,219 B2
(45) Date of Patent: Mar. 18, 2025

(54) METHOD FOR DETECTING LEAKS IN A GAS NETWORK UNDER PRESSURE OR UNDER VACUUM AND GAS NETWORK

(71) Applicant: ATLAS COPCO AIRPOWER, NAAMLOZE VENNOOTSCHAP, Wilrijk (BE)

(72) Inventors: Philippe Geuens, Wilrijk (BE); Ebrahim Louarroudi, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 517 days.

(21) Appl. No.: 17/418,389

(22) PCT Filed: Nov. 28, 2019

(86) PCT No.: PCT/IB2019/060290
§ 371 (c)(1),
(2) Date: Jun. 25, 2021

(87) PCT Pub. No.: WO2020/136475
PCT Pub. Date: Jul. 2, 2020

(65) Prior Publication Data
US 2022/0057048 A1 Feb. 24, 2022

Related U.S. Application Data

(60) Provisional application No. 62/785,254, filed on Dec. 27, 2018.

(30) Foreign Application Priority Data

Nov. 26, 2019 (BE) .................................. 2019/5838

(51) Int. Cl.
*F17D 5/02* (2006.01)
*F15B 19/00* (2006.01)
(Continued)

(52) U.S. Cl.
CPC .............. *F17D 5/02* (2013.01); *F15B 19/005* (2013.01); *G01M 3/28* (2013.01); *G08B 21/18* (2013.01)

(58) Field of Classification Search
CPC .......... F17D 5/02; F15B 19/005; G01M 3/28; G08B 21/18
(Continued)

(56) References Cited

U.S. PATENT DOCUMENTS 5,272,646 A * 12/1993 Farmer ............... G01M 3/2807
73/40.5 R
6,711,502 B2 3/2004 Mollison et al.
(Continued)

FOREIGN PATENT DOCUMENTS

| DE | 202008013127 U1 | 11/2009 |
| DE | 202010015450 U1 | 2/2011 |
| EP | 3409953 A1 | 12/2018 |

OTHER PUBLICATIONS

Belgian Search Report from corresponding BE Application No. BE201905838, Mar. 26, 2020.
International Search Report and Written Opinion from PCT Application No. PCT/IB2019/060290, Apr. 7, 2020.
International Preliminary Report on Patentability from PCT Application No. PCT/IB2019/060290, Dec. 23, 2020.
(Continued)

*Primary Examiner* — Aditya S Bhat
(74) *Attorney, Agent, or Firm* — Workman Nydegger

(57) ABSTRACT

A method is provided for detecting and quantifying leaks in a gas network under pressure or vacuum. The gas network may have a sensor(s) capable of recording the status of a source(s), consumers, consumer areas or applications. The method includes: a start-up phase; a training or estimation phase; and an operational phase. The operational phase includes: reading out the first group of sensors; calculating or determining the value of a second group of sensors from the readings from the first group of sensors; comparing the calculated or determined values of the second group of sensors with the read values of the second group of sensors
(Continued)

and determining the difference between them; determining, on the basis of a residual value analysis, whether there is a leak in the gas network; generating an alarm and/or generating a leakage rate and/or generating the corresponding leakage cost if a leak is detected.

12 Claims, 2 Drawing Sheets

(51) Int. Cl.
 *G01M 3/28* (2006.01)
 *G08B 21/18* (2006.01)
(58) Field of Classification Search
 USPC .......................................................... 702/51
 See application file for complete search history.

(56) References Cited

U.S. PATENT DOCUMENTS

| | | | |
|---|---|---|---|
| 7,031,850 | B2 | 4/2006 | Kambli et al. |
| 2003/0187595 | A1 | 10/2003 | Koshinaka et al. |
| 2010/0045471 | A1* | 2/2010 | Meyers ................... G01M 3/18 |
| | | | 340/605 |
| 2016/0356665 | A1 | 12/2016 | Felemban et al. |
| 2017/0003200 | A1 | 1/2017 | Mcdowell et al. |
| 2018/0196399 | A1 | 7/2018 | Rasekh et al. |

OTHER PUBLICATIONS

Japanese Office Action from corresponding Japanese Application No. 2021537856, Jan. 17, 2023.

* cited by examiner

METHOD FOR DETECTING LEAKS IN A GAS NETWORK UNDER PRESSURE OR UNDER VACUUM AND GAS NETWORK

BACKGROUND

The current invention relates to a method for detecting leaks in a gas network under pressure or under vacuum.

More specifically, the invention is intended to be able to quantify leaks that occur in a gas network.

"Gas" herein means for example air, but not necessarily. But also nitrogen or natural gas are possible.

Methods for monitoring or controlling a gas network under pressure are already known, whereby these methods are set up for long and straight pipelines, where the incoming flow is not necessarily equal to the outgoing flow due to the compressibility of the gas in question.

These methods are based on a number of assumptions such as very long pipelines, straight pipelines, which are not suitable for complex gas networks under pressure where one or more compressor plants supply gas under pressure to a complex network of consumers.

Also, methods are already in place, as described in U.S. Pat. Nos. 7,031,850 B2 and 6,711,502 B2, to detect leaks in pneumatic components or tools of the final consumers themselves. A final consumer may be an individual final consumer or include a so-called consumer area or a group of individual final consumers.

Methods for estimating the total leakage rate on the source side are also known from e.g. DE 20.2008.013.127 U1 and DE 20.2010.015.450 U1.

The disadvantage of such known methods is that they do not allow for the detection of leaks in a complex network of pipelines between the source and the consumers or consumer area. In addition, the network of pipelines of a gas or vacuum network is a source of leaks that should not be underestimated.

SUMMARY

The aim of the current invention is to provide a solution to this problem.

The current invention relates to a method for detecting and quantifying leaks in a pressurized gas network; the gas network comprising:
 one or more sources of compressed gas or vacuum;
 one or more consumers or consumer area of compressed gas or vacuum applications;
 pipelines or a network of pipelines to transport the gas or vacuum from the sources to the consumers, consumer area or applications;
 a plurality of sensors which determine one or a plurality of physical parameters of the gas at different times and locations in the gas network;
characterized in that the gas network may be further provided with additional sensors which indicate the state (e.g. on/off) of the sources, consumers, consumer areas or applications and that the method comprises the following steps:
 any start-up phase during which the aforementioned sensors are to be used;
 a training or estimation phase in which a physical model or mathematical relationship is determined between the measurements of a first set of sensors and a second set of sensors based on physical laws using estimation algorithms;
 an operational phase where the established physical model or mathematical relationship between the measurements of the first set of sensors and the second set of sensors is used to predict leaks in the gas network; wherein the operational phase comprises the following steps:
 reading out the first group and second group of sensors;
 from the readout measurements from the first set of sensors, calculating or determining the value of a second set of sensors using the physical model or mathematical relationship;
 comparing the calculated or certain values of the second group of sensors with the read values of the second group of sensors and determining the difference between them;
 determining, on the basis of a residual value analysis, whether there is a leak in the gas network;
 generating an alarm and/or generating a leakage rate and/or generating the corresponding leakage cost if a leak is detected.

An advantage is that such a method will make it possible to learn, detect and also quantify leaks in the gas network itself.

In other words, the leaks detected and quantified by the method are not limited to leaks in the sources or consumers of compressed gas, i.e. in the compressor plants and pneumatic tools or components, but may also concern leaks in the pipelines of the gas network itself.

It should be noted that in the case of a gas network under pressure, leaks will occur to the outside and gas will escape to the surrounding area. In a gas network under vacuum, leaks will occur 'inwards', i.e. ambient air will enter the gas network.

During the training phase, a mathematical relationship is established between this group of sensors on the basis of known physical laws and using the measurements of the various sensors.

Hereby an estimation algorithm is used.

This is based on the assumption that there are no leaks in the gas network in the first instance, in other words, it is based on a normal situation of the gas network or a so-called 'baseline'.

In this way, a physical model, or mathematical model, can be created that represents the relationship between the different parameters measured by the sensors.

This model will then be used to immediately detect irregularities in future measurements of the sensors by comparing the results of the model and the measurements of the sensors.

In this way, leaks will be detected very quickly and, in case of detection of a leak, action can be taken and the leak can be closed.

Preferably, at certain moments, the operational phase is temporarily interrupted or stopped, after which the training phase is resumed in order to redefine the physical model or mathematical relationship between the measurements of different sensors, before the operational phase is restarted.

It should be noted that the process, i.e. the gas network with sources, pipelines and consumers, is not shut down, but only the method. In other words, if the operational phase is temporarily interrupted or stopped, the sources will still supply gas or vacuum to the consumers.

Interrupting the operational phase and resuming the training phase has the advantage that the physical model or the mathematical relation is updated.

This will make it possible to take into account the time-varying behavior of the gas network or system, so that the detection of leaks does not depend on the varying behavior of the gas network. This is the case, for example, when a leak has been detected and dealt with after an energy audit, expansions of the gas network and/or introduced blockages in the network. In this case, the detection system starts from a new 'baseline' or null.

The invention also concerns a gas network under pressure or under vacuum; the gas network is at least provided with:
one or more sources of compressed gas or vacuum;
one or more consumers or consumer areas of compressed gas or vacuum applications;
pipelines or a network of pipelines to transport the gas or vacuum from the sources to the consumers, consumer areas or applications;
a plurality of sensors which determine one or a plurality of physical parameters of the gas at different times and locations in the gas network;
with the characteristic that the gas network is further provided with:
possibly one or a plurality of sensors which can register the state or status of one or a plurality of sources, consumers, consumer areas or applications;
a data acquisition control unit for the collection of data from the sensors;
a computing unit for carrying out the method in accordance with the invention.

Such an arrangement can be used to apply a method in accordance with the invention.

BRIEF DESCRIPTION OF THE DRAWINGS

To better demonstrate the characteristics of the invention, a number of preferred variants of a method and gas network in accordance with the invention have been described below, by way of example without any restrictive character, with reference to the accompanying drawings, in which:

FIG. 2 shows a schematic flowchart of the method in accordance with the invention.

DETAILED DESCRIPTION OF VARIOUS EMBODIMENTS

Figure 1:
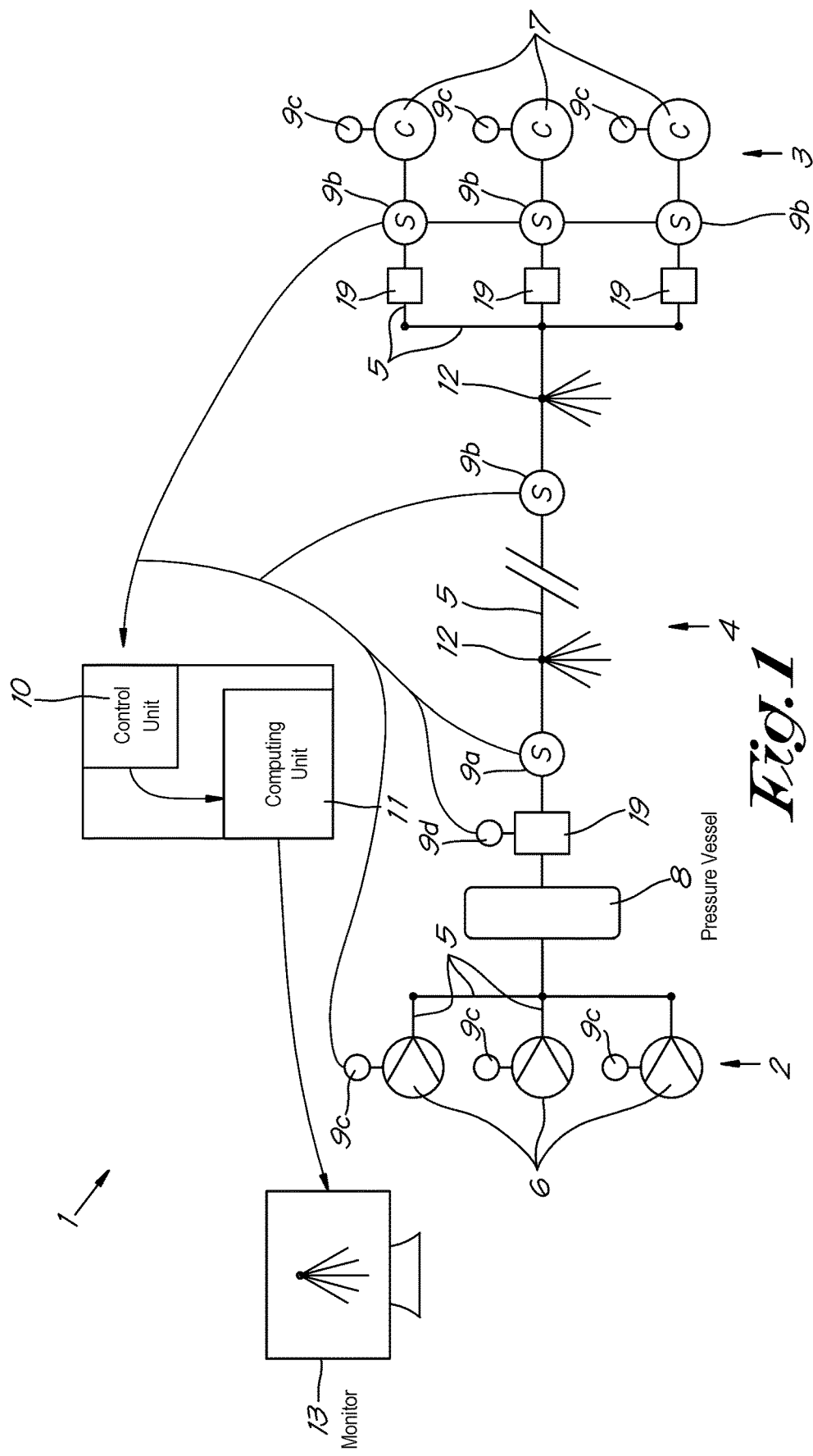
FIG. 1 schematically shows an arrangement in accordance with the invention.
Figure 9:
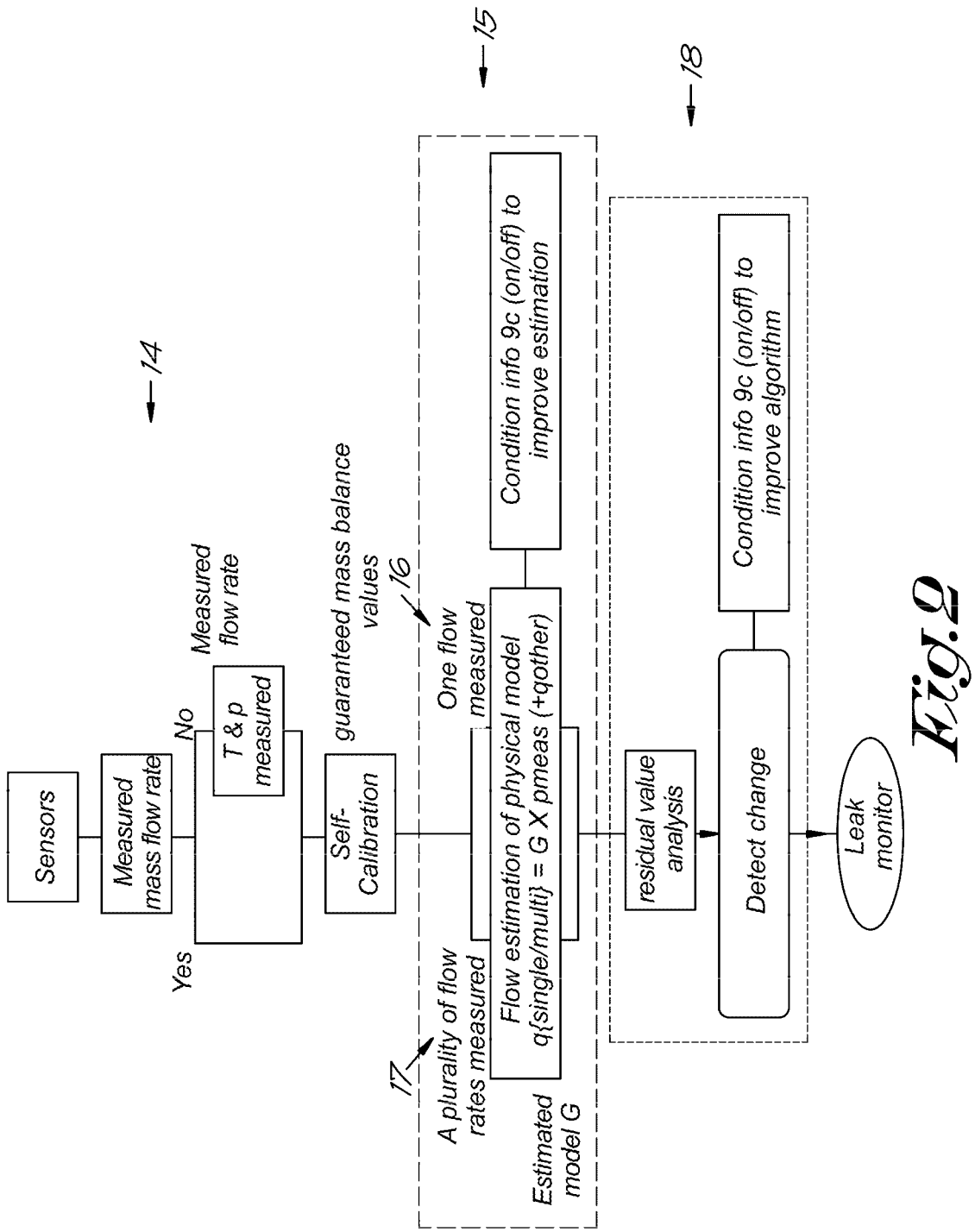

The gas network 1 in FIG. 1 comprises mainly a source side 2, a consumer side 3 and a network 4 of pipelines 5 between the two.

The gas network 1 in this case is a gas network 1 under pressure, i.e. there is a pressure higher than the atmospheric pressure.

The gas may be air, oxygen or nitrogen or any other non-toxic and/or hazardous gas or mixture of gases.

The source side 2 comprises a number of compressors 6, in this case three, which generate compressed air.

It is also possible that the compressors 6 contain compressed air dryers.

The consumer side 3 contains a number of consumers 7 of compressed air and in this case also three.

It is not excluded that the compressors 6 can also be located downstream of the gas network 1. This is referred to as "boost compressors".

The compressed air is routed through the network 4 of pipelines 5 from the compressors 6 to the consumers 7.

This network 4 is in most cases a very complex network of pipelines 5.

FIG. 1 shows this network 4 in a very schematic and simplified way. In addition, the associated shut-off and bypass valves in the gas network 1 are not explicitly indicated in order to maintain the simplicity in FIG. 1.

In most real situations, the network 4 of pipelines 5 consists of a large number of pipelines 5 that connect the consumers 7 in series and in parallel with each other and with the compressors 6. It is not excluded that a part of the network 4 adopts or comprises a ring structure.

This is because the gas network 1 is often extended over time with additional consumers 7 or compressors 6, whereby new pipelines 5 between the existing pipelines 5 have to be laid, which leads to a tangle of pipelines 5.

The gas network 1 may also be provided with a pressure vessel 8, with all compressors 6 in front of this pressure vessel 8.

It is not excluded that there may be one or more pressure vessels 8 downstream of the gas network 1.

In addition, components 19, such as filters, separators, atomizers and/or regulators, can also be provided in the gas network 1. These components 19 can be found in various combinations and can be found both near the pressure vessel 8 and close to the individual consumers 7.

In the example shown, these components 19 are provided after the buffer vessel 8 and near the individual consumers 7.

Network 4 also includes a number of sensors $9a$, $9b$, $9c$ and $9d$, which are located at different locations in network 4.

In this case, one flow sensor $9a$ is placed just after the aforementioned pressure vessel 8, which will measure the total flow q provided by all compressors 6. It is also possible that the individual flows of the compressors 6 are measured by themselves.

In addition, the figure shows four pressure sensors $9b$, which measure the pressure at different locations in the network 4.

A pressure sensor $9b$ to measure the pressure in the pressure vessel 8 is also recommended to correct the "mass in-mass out" principle for large, concentrated volumes.

It is clear that more or less than four pressure sensors $9b$ can also be provided. In addition, the number of flow sensors $9a$ is not limiting for the invention.

In addition to flow sensors $9a$ or pressure sensors $9b$, additionally, or alternatively, sensors $9a$, $9b$, may be used to determine one or a plurality of the following physical parameters of the gas: differential pressure, gas velocity, temperature or humidity.

In addition to the aforementioned sensors $9a$ and $9b$, which measure the physical parameters of the gas, there are also possibly a number of sensors $9c$, or 'state sensors $9c$', which are located close to the compressors 6, the consumers 7 or consumer areas. Preferably, these sensors $9c$ are part of the consumers 7 themselves, which is referred to as smart consumers.

These sensors $9c$ then determine the state or status, for example on or off, of the compressors 6, the consumers 7 or consumer areas. As explained later, by using these state sensors $9c$, the cross-sensitivity of the estimation algorithms can be reduced, so that these estimation algorithms become more reliable.

It is also possible that at least some of the sensors $9a$, $9b$, $9c$ together with a source 6 and/or consumer 7 are integrated in one module. This is referred to as 'smart connected pneumatic devices'.

It is also possible to use sensors $9a$, $9b$, which measure the pressure or flow of the gas at the consumers 7 or consumer areas. It is also possible to use sensors that measure the temperature of the gas at the consumers 7 or in the consumer area.

The aforementioned differential pressure sensors 9d coming from the group of additional or alternative sensors 9a, 9b are preferably placed over filter, separator, atomizer, and/or regulator components 19. It goes without saying that the number of differential pressure sensors 9d may differ from what is shown in FIG. 1.

The aforementioned humidity and temperature sensors coming from the group of additional or alternative sensors 9a, 9b are preferably mounted at the inlet and/or outlet of the compressors 6 and the consumers 7.

In the example shown, the aforementioned additional or alternative sensors 9a, 9b are not all included in the gas network 1, but it goes without saying that this is also possible. Certainly, in more extensive and complex gas networks 1 such sensors 9a, 9b can be used, as well as in networks 1 where only the volumetric flow rate is measured instead of the mass flow rate.

In accordance with the invention, the gas network 1 is further provided with a data acquisition control unit 10 to collect data from the aforementioned sensors 9a, 9b, 9c, 9d.

In other words, sensors 9a, 9b, 9c, 9d determine or measure the physical parameters of the gas and the state of the compressors 6, consumers 7 and/or consumer area and send this data to the data acquisition control unit 10.

In accordance with the invention, the gas network 1 is further provided with a computing unit 11 for processing the data from sensors 9a, 9b, 9c, 9d, whereby the computing unit 11 will be able to carry out the method for detecting and quantifying leaks 12 in the gas network 1 in accordance with the invention, as explained below.

The aforementioned computing unit 11 can be a physical module which is a physical part of the gas network 1. It cannot be excluded that the computing unit 11 is not a physical module, but a so-called cloud-based computing unit 11, which may or may not be connected wirelessly to the gas network 1. This means that the computing unit 11 or the software of the computing unit 11 is located in the 'cloud'.

In this case, the gas network 1 is further provided with monitor 13 to display or signal leaks 12 that were detected using the method.

The operation of gas network 1 and the method in accordance with the invention is very simple and as follows:

FIG. 2 schematically illustrates the method for detecting and quantifying leaks 12 in the gas network 1 of FIG. 1.

In the first phase 14, start-up phase 14, sensors 9a, 9b, 9c, 9d are calibrated before use if necessary. It goes without saying that if there are other sensors, they can also be calibrated before use.

This happens once when the sensors 9a, 9b, 9c, 9d are placed in the gas network 1. Of course, it is possible that sensors 9a, 9b, 9c, 9d may be recalibrated over time.

Preferably, the sensors 9a, 9b, 9c, 9d are calibrated in operation or by means of an in-situ self-calibration. This means that sensors 9a, 9b, 9c, 9d in the gas network 1, i.e. after they have been installed, are calibrated. 'In operation' or 'in situ' means calibration without removing sensor 9a, 9b, 9c, 9d from the gas network 1.

In this way one can be sure that the placement of the sensors 9a, 9b, 9c, 9d will not affect their measurements, because the calibration will only be done after the placement of the sensors 9a, 9b, 9c, 9d.

Then the second phase 15 or the training phase 15 starts.

In this phase, a physical model or mathematical relationship is determined between the measurements of a first group of sensors 9a, 9b, 9c, 9d and a second group of sensors 9a, 9b, 9c, 9d based on physical laws using estimation algorithms. By adding additional state sensors 9c (e.g. on/off) from compressors 6, consumers 7 or consumer areas, the noise sensitivity of the estimation algorithms can be reduced, making the estimation algorithms more reliable.

Based on known physical laws, a model can be made between a first group of sensors 9a, 9b, 9c, 9d and a second group of sensors 9a, 9b, 9c, 9d.

This first group of sensors 9a, 9b, 9c, 9d preferably all measure the same physical parameter of the gas, for example pressure p and/or pressure difference dp, at different locations in the gas network 1. The second group of sensors 9a, 9b, 9c, 9d preferably all measure the same physical parameter of the gas, for example the flow rate q.

For example, the model consists of a mathematical relation such as a matrix or the like, in which there are still a number of parameters or constants.

These parameters or constants can be determined by reading out the corresponding sensors 9a, 9b, 9c, 9d and using estimation algorithms.

This is based on a kind of baseline situation or a normal situation of the gas network 1 without leaks 12.

The mathematical model is also based on the assumption that the resistance of the pipelines 5 does not change and that the topology of the network 4 is fixed.

The data acquisition control unit 10 will read out the sensors 9a, 9b, 9c, 9d and send these data to the computing unit 11, where the necessary calculations will be performed to determine the aforementioned parameters or constants.

Once the parameters or constants have been determined, the physical model is determined, in the form of a mathematical relationship between the two groups of sensors 9a, 9b, 9c, 9d.

In the example shown, a first situation 16 is shown on the right-hand side of FIG. 2, whereby the second group comprises one flow sensor 9a as shown in FIG. 1, and a second situation 17 on the left-hand side of FIG. 2, whereby the second group may comprise a plurality of flow sensors 9a.

For the second situation 17, several flow sensors 9a will be placed in the network 4, such as close to the consumers 7 or consumer areas, which form the second group of sensors 9a.

The first group of sensors 9a, 9b, 9c, 9d in both cases includes different pressure sensors 9b and/or differential pressure sensors 9d at different locations in the gas network 1 and possibly one or a plurality of flow sensors 9a. It is important to note that the flow sensor(s) 9a of the second group are different from the flow sensors 9a of the first group. The only condition is therefore that the cross-section of the two groups of sensors 9a, 9b, 9c, 9d must be empty.

In both situations 16, 17, the method for determining the physical model is almost identical.

The physical model in the form of a mathematical relationship between the measurements of the first group and the second group of sensors 9a, 9b, 9c, 9d can be used in an operational phase 18 to detect and quantify leaks 12 in the gas network 1.

The operational phase 18 is carried out during the operation of the gas network 1, i.e. when the compressors 6 supply compressed gas through the network 4 of pipelines 5 to the different consumers 7. It is during the operation of gas network 1 that it will be important to be able to detect and quantify leaks 12.

The operational phase 18 is similar for both of the aforementioned situations and is as follows:

reading out the first group of sensors 9a, 9b, 9c;
from the readings from the first set of sensors 9a, 9b, 9c, calculating or determining the value of a second set of sensors 9a, 9b, 9c using the physical model or mathematical relationship;
comparing the determined or calculated value of the second group of sensors 9a, 9b, 9c, 9d with the read value of the second group of sensors 9a, 9b, 9c, 9d and determining the difference between them;
based on a residual value analysis and possibly the state sensors 9c, calculating if there is a leak 12 in the system;
generating an alarm if a leak 12 is detected with possibly the corresponding leakage flow and/or leakage cost.

Also here, the data acquisition control unit 10 will collect the different data from sensors 9a, 9b, 9c and the computing unit 11 will perform the necessary calculations using the physical model established in the previous phase 15.

These steps of the operational phase 18 are preferably repeated sequentially at a certain time interval.

As a result, during the entire operational period of the gas network 1, leaks 12 can be detected and traced, and not just once, for example, during or shortly after the start-up of the gas network 1.

The aforementioned time interval can be selected and set depending on the gas network 1.

In the aforementioned first situation 16, as shown on the right-hand side of FIG. 2, the operational phase 18 comprises the following steps:
reading out the first group of sensors 9a, 9b, 9c, 9d;
from the readings of the first group of sensors 9a, 9b, 9c, 9d, calculating or determining the value of the aforementioned flow sensor 9a of the second group of sensors 9a, 9b, 9c, 9d using the physical model or mathematical relationship;
comparing the calculated or determined value of this flow sensor 9a with the read value of this flow sensor 9a and using a residual value analysis to determine whether there is a leak 12 in the gas network 1.

This method has the advantage that only one flow sensor 9a is needed, both in the training phase 15 and in the operational phase 18.

A flow sensor 9a is generally technically more difficult to realize, more complex and more expensive than a pressure sensor 9b and/or a differential pressure sensor 9d. By minimizing the number of flow sensors 9a to one, the system is cheaper.

To determine a leak 12 in the gas network 1, in the last step the determined or calculated value of the flow q will be compared with the read value of the flow sensor 9a taking into account any information coming from the state sensors 9c.

If the difference between the two exceeds a certain threshold, this indicates a leak 12 in the gas network 1.

This threshold can be set or selected in advance.

When a leak 12 is detected, an alarm will be generated. In this case, this is done with the help of monitor 13, which displays the alarm.

The user of the gas network 1 will notice this alarm and be able to take the appropriate steps.

In the aforementioned second situation 17, as shown on the right-hand side of FIG. 2, the operational phase 18 comprises the following steps:
reading out the first group of sensors 9a, 9b, 9c, 9d;
from the readings of the first group of sensors 9a, 9b, 9c, 9d, calculating or determining the value of the aforementioned flow sensors 9a of the second group of sensors 9a, 9b, 9c, 9d using the physical model or mathematical relationship;
comparing the calculated or determined value of these flow sensors 9a with the read value of the flow sensors 9a and determining on the basis of a residual value analysis whether there is a leak 12 in the gas network 1.

If one of the differences or its derivative, such as a (weighted) sum, exceeds a certain threshold, this will indicate a leak 12 in the gas network 1 and an alarm will be generated in a similar way as in the first situation.

In this case too, one or more thresholds can be set or selected in advance.

Starting from multiple flow sensors 9a, the method in the second situation 17 has the advantage that the leaks 12 are easier to locate.

As mentioned before, these steps of the operational phase will be repeated sequentially and cyclically.

In a preferred variant of the invention, at certain moments, the operational phase 18 will be temporarily interrupted or stopped, after which the training phase 15 will be resumed to redefine the physical model or mathematical relationship between the measurements of different sensors, before the operational phase 18 is restarted.

'At certain moments' should be interpreted as moments that are preset, for example once a week, per month or per year, or as moments that can be chosen by the user as it suits the user.

The physical model will be updated to take into account the possible time-varying behavior of the system.

This could include, for example, leaks 12 in the network 4 which are closed by replacing the relevant parts or seals, additional blockages in the network 4 or changes in the topology of the network 4.

Although in the example of FIG. 1, it concerns a gas network 1 under pressure, it can also be a gas network 1 under vacuum.

Source side 2 then comprises a number of sources of vacuum, i.e. vacuum pumps or similar.

In this case, the consumers 7 have been replaced by applications that require vacuum.

Furthermore, the method is the same, taking into account of course that leaks now introduce ambient air into the gas network 1. Preferably, other suitable thresholds will be set to generate an alarm.

This invention is by no means limited to the embodiments by way of example and shown in the figures, but such a method and gas network as claimed in the invention can be carried out in different variants without going beyond the scope of the invention.

The invention claimed is:

1. A method for detecting and quantifying leaks in a gas network under pressure or vacuum, the gas network including: one or more sources of compressed gas or vacuum; one or more consumers or consumer areas of compressed gas or vacuum applications; pipelines or a network of pipelines to transport the gas or vacuum from the sources to the consumers, consumer areas or applications; and a plurality of sensors providing one or more physical parameters of the gas at different times and locations within the gas network; wherein the gas network is also provided with one or a plurality of sensors capable of recording the state or status of one or a plurality of sources, consumers, consumer areas or applications and that the method comprises the following steps:

during a start-up phase, calibrating the aforementioned sensors before use;

during a training phase, determining a physical model or mathematical relationship between measurements of a first set of sensors and a second set of sensors based on physical laws using estimation algorithms, wherein the physical model or mathematical relationship represents a relationship between different physical parameters of the gas;

during an operational phase executed after the training phase, using the determined physical model or mathematical relationship between the measurements of the first set of sensors and the second set of sensors from the training phase to predict leaks in the gas network;

wherein the operational phase comprises the following steps:

reading out a first group of sensors;

calculating or determining values of a second group of sensors from the readings of the first group of sensors based on the physical model or mathematical relationship determined in the training phase;

comparing the calculated or determined values of the second group of sensors with the read values of the second group of sensors and determining the difference between them;

determining, on the basis of a residual value analysis, whether there is a leak in the gas network;

generating an alarm and/or generating a leakage rate and/or generating a corresponding leakage cost if a leak is detected.

2. The method according to claim 1, wherein the first group of sensors comprises different pressure and/or pressure differential sensors at different locations in the gas network, one or a plurality of flow sensors and a plurality of sensors capable of determining the status of the sources, consumers, consumer areas or applications, and the second group of sensors comprises a flow sensor, wherein the operational phase comprises the following steps after reading out the first group of sensors:

from the readings of the first group of sensors, calculating or determining the value of the flow sensor of the second group of sensors using the physical model or mathematical relationship;

comparing the calculated or determined value of the flow sensor of the second group of sensors with the read value of the flow sensor of the second group of sensors and determining whether there is a leak in the gas network on the basis of the difference between the two, or its derivatives.

3. The method according to claim 1, wherein the sensors are calibrated by means of an in-situ self-calibration.

4. The method according to claim 1, wherein the aforementioned sensors can measure one or more of the following physical parameters of the gas:

pressure, differential pressure, temperature, gas velocity, flow rate, humidity.

5. The method according to claim 1, wherein the operational phase is temporarily interrupted or stopped at certain moments, after which the training phase is resumed in order to redefine the physical model or mathematical relationship between the measurements of different sensors before the operational phase is resumed.

6. The method according to claim 1, wherein the operational phase steps are sequentially repeated at a certain time interval.

7. A gas network under pressure or under vacuum, the gas network is at least provided with:

one or more sources of compressed gas or vacuum;

one or more consumers, consumer areas of compressed gas or vacuum applications;

pipelines or a network of pipelines to transport the gas or vacuum from the sources to the consumers, consumer areas or applications;

a plurality of sensors providing one or more physical parameters of the gas at different times and locations within the gas network;

wherein the gas network is further provided with:

one or more sensors which can register the state or status of one or more sources consumers, consumer areas or applications, a data acquisition control unit for the collection of data from the sensors;

a computing unit for carrying out the method according to claim 1.

8. The gas network according to claim 7, wherein at least some of the sensors together with a source, consumer, consumer area or application are integrated in one module.

9. The gas network according to claim 7, wherein the gas network is further provided with a monitor to display or signal leaks, leakage rates, leakage costs and possible location.

10. The gas network according to claim 7, wherein the computing unit is a cloud-based computing unit, which is connected to the gas network, either or not wireless.

11. The gas network according to claim 7, wherein the estimation algorithms are based on a baseline situation of the gas network.

12. The method according to claim 1, wherein the step of determining whether there is a leak in the gas network is further based on information obtained from state sensors configured and arranged to reduce cross-sensitivity of the estimation algorithms.

* * * * *